US007770696B2

(12) United States Patent
Futahashi et al.

(10) Patent No.: US 7,770,696 B2
(45) Date of Patent: Aug. 10, 2010

(54) ENERGY RECOVERING SYSTEM OF HYDRAULIC LIFT DEVICE FOR BATTERY OPERATED INDUSTRIAL TRUCKS

(75) Inventors: Kensuke Futahashi, Takasago (JP); Hiroshi Satou, Takasago (JP); Masataka Kawaguchi, Takasago (JP); Fujio Eguchi, Sagamihara (JP); Toshiyuki Honda, Sagamihara (JP); Keizo Ogino, Nagaokakyo (JP); Shingo Yuguchi, Nagaokakyo (JP); Kazuhito Kawashima, Nagakakyo (JP); Michio Akao, Nagaokakyo (JP)

(73) Assignees: Mitsubishi Heavy Industries, Ltd., Tokyo (JP); Nippon Yusoki Co., Ltd., Kyoto (JP)

( * ) Notice: Subject to any disclaimer, the term of this patent is extended or adjusted under 35 U.S.C. 154(b) by 383 days.

(21) Appl. No.: 11/663,352

(22) PCT Filed: Feb. 15, 2006

(86) PCT No.: PCT/JP2006/303086
§ 371 (c)(1),
(2), (4) Date: Jul. 2, 2007

(87) PCT Pub. No.: WO2006/090709
PCT Pub. Date: Aug. 31, 2006

(65) Prior Publication Data
US 2007/0278048 A1 Dec. 6, 2007

(30) Foreign Application Priority Data
Feb. 25, 2005 (JP) .............................. 2005-052163

(51) Int. Cl.
*B66F 9/22* (2006.01)
*F15B 21/14* (2006.01)
*F16D 31/02* (2006.01)

(52) U.S. Cl. .................... 187/224; 187/275; 60/414; 60/484

(58) Field of Classification Search ................. 414/636; 187/224, 275; 318/293, 34; 60/477, 479, 60/481, 484, 911, 413, 414; 91/459, 361; 180/422
See application file for complete search history.

(56) References Cited

U.S. PATENT DOCUMENTS 3,512,072 A * 5/1970 Karazija et al. ............. 320/127

(Continued)

FOREIGN PATENT DOCUMENTS

JP 2-27499 A 1/1990

(Continued)

OTHER PUBLICATIONS

Microfilm of the specification and drawings annexed to the request of Japanese Utility No. 25802/1988) (Kubota Tekko Kabushiki Kaisha), Feb. 20, 1988, Full text; Figs. 1 to 4.

*Primary Examiner*—Walter Benson
*Assistant Examiner*—Eudardo Colon-Santana
(74) *Attorney, Agent, or Firm*—Birch, Stewart, Kolasch & Birch, LLP (57) ABSTRACT

An energy recovering system of a hydraulic lift device for a battery operated industrial truck. With the system, working oil can be supplied to other hydraulic actuators while energy recovering operation is performed by the hydraulic lift device, and energy recovering efficiency is increased. A hydraulic motor (6) is disposed in a fluid path for recovering pressurized working fluid from a lift cylinder (1) via a control valve (10) to a working fluid reservoir tank (8) so that the hydraulic motor (6) is driven by the pressurized working fluid returning from the lift cylinder (1). The hydraulic motor (6) is connected to an electric motor (4) for driving a hydraulic pump (3), which supplies pressurized fluid to the lift cylinder (1), by means of a one-way clutch (7) which performs torque transmission only from the hydraulic motor (6) to the electric motor (4).

9 Claims, 9 Drawing Sheets

U.S. PATENT DOCUMENTS

| | | | | |
|---|---|---|---|---|
| 4,723,107 A * | 2/1988 | Schmid | | 322/35 |
| 4,761,954 A * | 8/1988 | Rosman | | 60/414 |
| 5,505,043 A * | 4/1996 | Baginski et al. | | 60/477 |
| 6,460,332 B1 * | 10/2002 | Maruta et al. | | 60/414 |
| 6,922,989 B2 * | 8/2005 | Nagura et al. | | 60/414 |
| 7,086,226 B2 * | 8/2006 | Oguri | | 60/414 |
| 7,249,457 B2 * | 7/2007 | Raszga et al. | | 60/419 |
| 7,600,612 B2 * | 10/2009 | Passeri | | 187/224 |
| 2005/0036894 A1 | 2/2005 | Oguri | | |

FOREIGN PATENT DOCUMENTS

| | | | |
|---|---|---|---|
| JP | 2-163300 A | | 6/1990 |
| JP | 02169499 A | * | 6/1990 |
| JP | 4-347381 A | | 12/1992 |
| JP | 7-125994 A | | 5/1995 |
| JP | 2880887 B2 | | 1/1999 |
| JP | 2000-351574 A | | 12/2000 |
| JP | 2003252592 A | * | 9/2003 |
| JP | 2004-84470 A | | 3/2004 |

* cited by examiner

ENERGY RECOVERING SYSTEM OF HYDRAULIC LIFT DEVICE FOR BATTERY OPERATED INDUSTRIAL TRUCKS

TECHNICAL FIELD

The present invention relates to an energy recovering system of a hydraulic lift device for battery operated industrial tracks such as a forklift truck or the like, specifically to an energy recovering system for recovering the potential energy generated by a hydraulic lift device having a hydraulic pump for supplying pressurized working fluid to a lift cylinder to lift and lower a load on a lift means, an electric motor for driving the hydraulic pump, a hydraulic motor for recovering the potential energy of the load by allowing the hydraulic motor to be driven by the pressurized working fluid returning from the lift cylinder when the load is lowered, whereby the hydraulic pump is connected directly to the electric motor and the hydraulic motor is connected to the electric motor by means of a one-way clutch so that the electric motor is driven by the hydraulic motor to be allowed to function as an electric generator, thus the hydraulic pump, electric motor, and hydraulic motor are connected tandem and the system is composed simple in construction.

BACKGROUND ART

As a battery operated industrial truck equipped with a load handling hydraulic device having an electric motor for driving a hydraulic motor, a forklift truck is known for example, in which a hydraulic pump is allowed to function as a hydraulic motor driven by working oil returning from a lift cylinder when a load is lowered and an electric motor connected to the pump is allowed to function as an electric generator to charge the battery to recover the potential energy of the load.

There has been disclosed energy recovering systems, for example in Japanese Laid-Open Patent Application No. 2-169499 and in U.S. Pat. No. 5,505,043, in which the hydraulic pump is rotated reversely by the working fluid pushed out from the lift cylinder in the lowering operation to function as an electric generator.

The system disclosed in said JP 2-169499 is composed such that an electromagnetic clutch is installed between the electric motor and the hydraulic pump, and power transmission between the hydraulic pump and the motor is shut off by the electromagnetic clutch when energy recovering is not possible when the load is lowered.

The hydraulic lift device disclosed in said U.S. Pat. No. 5,505,043 comprises two pairs of a hydraulic pump and a DC motor respectively for supplying working oil to the lift cylinder and to auxiliary means. With the energy recovering system, potential energy of the load can be effectively utilized, however, there is a problem that supplying pressurized oil to other actuators to actuate other devices is not possible by using the same hydraulic pump connected to the electric motor while operation of supplying working oil to the lift cylinder or recovering potential energy of the load is performed.

Further, the lift device disclosed in said U.S. Pat. No. 5,505,043 has disadvantages that a plurality of hydraulic pumps and a plurality of electric motors are needed, construction becomes complicated, and weight is increased.

DISCLOSURE OF THE INVENTION

The present invention was made in light of the problems of prior art, and the object of the invention is to provide a compact system for recovering the potential energy generated by a hydraulic lift device for a battery operated industrial track such as a forklift truck or the like, in which working fluid can be supplied to other actuators while performing the energy recovering operation and energy recovering efficiency is improved.

To attain the object, the present invention proposes an energy recovering system of a hydraulic lift device for a battery operated industrial truck which is provided with a lift cylinder for lifting a lift means, an electric motor driven by a battery power source, a hydraulic pump for supplying pressurized working fluid to said lift cylinder to lift said lift means, and a control valve disposed between said lift cylinder and said hydraulic pump, whereby when said lift means lowers in a state the pressurized working oil is not being supplied to said lift cylinder the pressurized working fluid is returned from said lift cylinder to a working fluid reservoir tank by downward force exerting on the pressurized working fluid in said lift cylinder, wherein a hydraulic motor is disposed in a working fluid recovering path through which the pressurized working fluid returns from said lift cylinder via said control valve so that said hydraulic motor is driven by the pressurized working fluid returning through said working fluid recovering path, and said hydraulic motor is connected to said electric motor with a one-way clutch with which torque transmission is possible only from said hydraulic motor to said electric motor.

According to the invention, the hydraulic motor is connected to the electric motor by means of the one-way clutch so that torque transmission is performed only from the hydraulic motor to the electric motor, so when the hydraulic pump is driven by the electric motor and the lift means is being raised, the rotation of the hydraulic motor is not transmitted to the hydraulic motor. Therefore, useless energy consumption can be prevented which occurs if torque transmission from the electric motor to the hydraulic motor is not shutoff and the hydraulic motor is driven uselessly.

On the other hand, when the lift means is lowering and the hydraulic motor is driven by the pressurized working fluid to recover the potential energy of the load, the output torque of the hydraulic motor is transmitted to the electric motor.

In the invention, one-way clutch means a torque transmission means which can transmit driving torque from the hydraulic motor to the electric motor and can not transmit driving torque from the electric motor to the hydraulic motor.

As mentioned above, according to the invention, the hydraulic motor is not driven by the electric motor when the electric motor drives the hydraulic pump, and the hydraulic pump can be driven by utilizing the output torque of the hydraulic motor.

As the electric motor serves both as an electric motor for driving the hydraulic pump and as an electric generator driven by the hydraulic motor for recovering energy, installation space is saved compared with the case a separate electric generator (or electric motor) is provided, and total weight of the system can be decreased.

In the invention, it is preferable that a second actuator for allowing another operation to be performed is provided in addition to said lift cylinder, and a second control valve through which pressurized working fluid is supplied to said second actuator from said hydraulic pump is provided.

By this, working oil can be supplied to another actuator while performing energy recovering operation.

As the second actuator can be cited a tilt cylinder for tilting a mast to which a fork of a forklift truck is installed movably along the mast, a power steering gear, a braking device, and other attachments.

In the invention, it is preferable that an electromagnetic valve is disposed in a pressurized working fluid supply path connecting said hydraulic pump to said control valve, said electromagnetic valve being opened to allow pressurized working fluid discharged from said hydraulic pump to be returned to said working fluid reservoir tank when energy recovering operation is performed.

By this, working oil discharged from the hydraulic pump driven by the hydraulic motor via the electric motor to the working fluid supply path when the lift means is lowered and the potential energy is recovered can be bypassed to the working fluid reservoir tank, and energy loss due to driving the hydraulic pump is largely reduced with the result that energy recovering efficiency is increased.

Further, by providing a controller and controlling said electromagnetic valve to open slowly and close slowly, rapid change in oil pressure can be suppressed when the electromagnetic valve opens or closes, and operability can be increased.

In the invention, it is preferable that a branch path branching from a working fluid recovering path connecting said control valve to said hydraulic motor with its end part being immersed in working fluid in said working fluid reservoir tank is provided, and a check valve is disposed in said branch path to prevent working fluid from flowing into said working fluid reservoir tank.

When lowering operation of the lift means is finished, the control valve disposed in the working fluid recovering path connecting the lift cylinder and the hydraulic motor is closed at once. On the other hand, the hydraulic motor continues to rotate for some time due to rotatory inertia of the rotating members, so negative pressure occurs abruptly at the inlet of the hydraulic motor and cavitation is feared to occur which may cause damage to the hydraulic motor.

The occurrence of cavitation can be prevented by preventing the occurrence of negative pressure through allowing the working fluid in the working fluid reservoir tank to be sucked through the branch path to the inlet of the hydraulic motor when the negative pressure occurs at the inlet thereof, thereby preventing the occurrence of damage to the hydraulic motor.

The check valve disposed in the branch path prevents the working fluid returning from the lift cylinder during energy recovering operation from being bypassed from the working fluid recovering path to the working fluid reservoir tank via the branch path.

In the invention, it is preferable that a flow path changeover valve disposed in said working fluid recovering path connecting said control valve to said hydraulic motor to allow working fluid to be selectively returned to said working fluid reservoir tank, a pressure sensor for detecting pressure in a bottom fluid chamber of said lift cylinder, and a controller which sends a directive to said flow path changeover valve to allow pressurized working fluid to bypass said hydraulic motor to be returned to said working fluid reservoir tank based on the pressure detected by said pressure sensor when said detected pressure is not sufficient for enabling energy recovering operation, are provided.

There is a possibility that, when the lift means is empty or light loaded and the hydraulic motor can not be rotated by working fluid returning through the working fluid recovering path in load lowering operation due to pressure loss in the control valve and the hydraulic motor, sufficient lowering speed of the lift means can not be obtained. In such a case, working fluid is allowed to return to the working fluid reservoir tank via the changeover path without being introduced to the hydraulic pump by manipulating the flow path changeover valve.

In the invention, it is preferable to install an electromagnetic clutch between said hydraulic pump and said electric motor. This makes it possible to increase energy recovering efficiency by shutting off the electromagnetic clutch when performing energy recovering operation, since energy loss caused by driving the hydraulic motor is eliminated.

In this case, the provision of the electromagnetic clutch will result in increased cost. So, when making much account of cost and it is permissible to sacrifice cost to some extent, it is suitable to provide the electromagnetic valve which opens, when energy recovering operation is performed, in order to allow the working fluid discharged from the hydraulic pump rotated by the hydraulic motor via the electric motor to return to the working fluid reservoir tank, instead of providing the electromagnetic clutch.

In the invention, it is preferable that at least one of said hydraulic pump and hydraulic motor is of variable capacity type.

In this case, by allowing the hydraulic pump and/or hydraulic motor to operate at the rotation speed and flow rate of working fluid, with which the pump and/or motor operate with high efficiency, energy recovering efficiency is increased.

According to the present invention, by providing a hydraulic motor in a fluid path for recovering pressurized working fluid from a lift cylinder via a control valve to a working fluid reservoir tank so that the hydraulic motor is driven by the pressurized working fluid, and connecting an electric motor for driving a hydraulic pump to a hydraulic motor by means of a one-way clutch which performs torque transmission only from the hydraulic motor to the electric motor, rotation of the hydraulic motor is not transmitted to the hydraulic motor when the hydraulic pump is driven by the electric motor to raise a lift means. Therefore, useless energy consumption can be prevented which occurs if torque transmission from the electric motor to the hydraulic motor is not shutoff and the hydraulic motor is driven uselessly. On the other hand, when the lift means is lowering and the hydraulic motor is driven by the pressurized working fluid to recover the potential energy of the load, the output torque of the hydraulic motor can be transmitted to the electric motor to allow the electric motor to function as an electric generator.

The hydraulic pump can be driven by utilizing the output torque of the hydraulic motor, and as the electric motor serves both an electric motor for driving the hydraulic pump and as an electric generator driven by the hydraulic motor for recovering energy, so installation space is saved compared with the case a separate electric generator (or electric motor) is provided, and total weight of the system can be decreased.

BEST MODE FOR EMBODIMENT OF THE INVENTION

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

The First Embodiment

Figure 1:
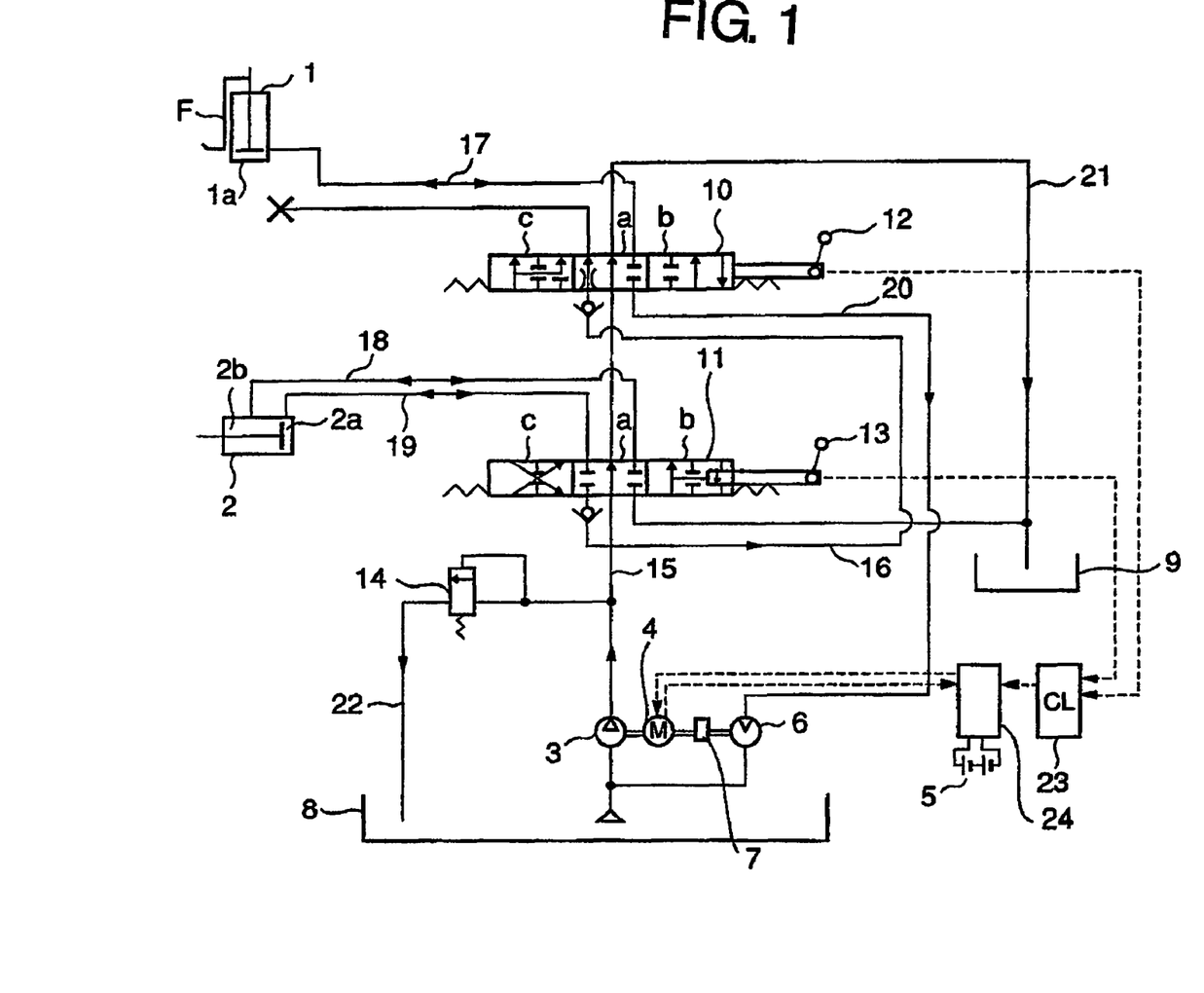
FIG. 1 is a schematic hydraulic lift circuit of the first embodiment of the invention.

FIG. 1 is a schematic hydraulic lift circuit of the first embodiment of the invention applied to a hydraulic device for a forklift truck.

In FIG. 1, reference numeral 1 is a lift cylinder for lifting a fork F (lift means) of the forklift truck, 2 is a tilt cylinder for tilting a mast to which the fork F is installed, 3 is a hydraulic pump for supplying pressurized oil to the lift cylinder 1 and the tilt cylinder 2, 5 is a set of batteries for supplying electricity to an electric motor 4, 6 is a hydraulic motor which is disposed in a working oil recovering path 20 connected to a bottom oil chamber 1a of the lift cylinder 1 so that it is driven by pressurized oil returning from the bottom oil chamber 1a. The electric motor 4 is driven by the hydraulic motor 6 to be allowed to function as an electric motor, the generated AC power is converted into DC by means of an inverter 24 to charge the set of batteries 5 connected to the inverter 24.

Reference numeral 7 is a one-way clutch, which is connected to the rotational shaft of the electric motor 4 and that of the hydraulic motor 6 such that transmission of torque is possible only from the hydraulic motor 6 to the electric motor 4 and driving torque of the electric motor 4 can not be transmitted to the hydraulic motor 6. Reference numerals 8 and 9 are tanks for reserving working oil, 10 is a control valve for controlling supply of pressurized working oil to the lift cylinder 1, and 11 is a control valve for controlling supply of pressurized working oil to the tilt cylinder 2.

Reference numeral 12 is a control lever for manipulating the control valve 10, 13 is a control lever for manipulating the control valve 11. Reference numeral 14 is a relief valve which is disposed in a working oil recovering path 22 in order to relieve pressure in a working oil supply path 15 when the pressure exceeds a specified allowable pressure by allowing a part of the working oil in the oil supply path 15 to be bypassed to the oil reservoir tank 8.

Reference numeral 23 is a controller, to which the manipulation amount (pivotal rate) of each of the control lever 12 and 13 is inputted, and which establishes a number of rotations of the electric motor 4 based on the inputted pivotal rates of the control lever 12 and 13 and sends the established number of rotations to the electric motor 4 via the inverter 24, whereby the inverter 24 takes in the actual number of rotations of the electric motor 4 and rotation speed of the electric motor 4 is controlled to be the established number of rotations.

In the system of the first embodiment, when the lift cylinder 1 and tilt cylinder 2 are not activated, port a of each of the control valve 10 for lifting operation and the control valve 11 for tilting operation are allowed to coincide with the oil supply path 15, and pressurized oil is returned to the oil reservoir tank 9 through the path 15 and 21.

When raising the fork F, the control lever 12 is manipulated to allow port c of the control valve 10 for lifting operation to coincide with the oil supply path 15 so that pressurized working oil is supplied from the hydraulic pump 3 to the bottom oil chamber 1a of the lift cylinder 1 through a path 16 and 17.

When it is necessary to tilt the fork F at the same time, the fork F can be tilted backward or forward by manipulating the control lever 13 so that port b or port c of the control valve 11 for tilting operation coincides with the supply path 15 and allowing pressurized oil to be supplied to a right oil chamber 2a or left oil chamber 2b of the tilt cylinder 2 through an oil supply path 18 or 19.

When lowering the fork F, by manipulating the control lever 12 so that port b of the control valve 10 for lifting operation coincides with the oil recovering path 20, pressurized oil is returned from the bottom oil chamber 1a of the lift cylinder 1 through the oil recovering path 20, whereby the hydraulic motor disposed in the oil recovering path 20 is driven by the pressurized oil returning from the bottom oil chamber 1a, the electric motor 4 is driven by the hydraulic motor 6 to function as an electric generator, and the generated electric power is charged to the set of batteries 5 via the inverter 24 connected to the set of batteries 5.

As mentioned above, although the drive torque of the hydraulic motor 6 is transmitted to the electric motor 4 and the hydraulic pump 3 by means of the one-way clutch 7, drive torque transmission from the electric motor 3 to the hydraulic motor 6 is shutoff by the one-way clutch 7.

As described above, according to the first embodiment, drive torque of the electric motor 4 is not transmitted to the hydraulic pump 6 when the hydraulic pump is driven by the electric motor 4 and the fork F is raised, so useless energy consumption can be prevented which occurs if torque transmission from the electric motor 3 to the hydraulic motor 6 is not shutoff and the hydraulic motor 6 is driven uselessly.

Further, as the hydraulic pump 3 can be driven by utilizing the output torque of the hydraulic motor 6 and the electric motor serves both as an electric motor for driving the hydraulic pump and as an electric generator driven by the hydraulic motor for recovering energy, installation space is saved compared with the case a separate electric generator (or electric motor) is provided, and total weight of the system can be decreased.

The Second Embodiment

Figure 2:
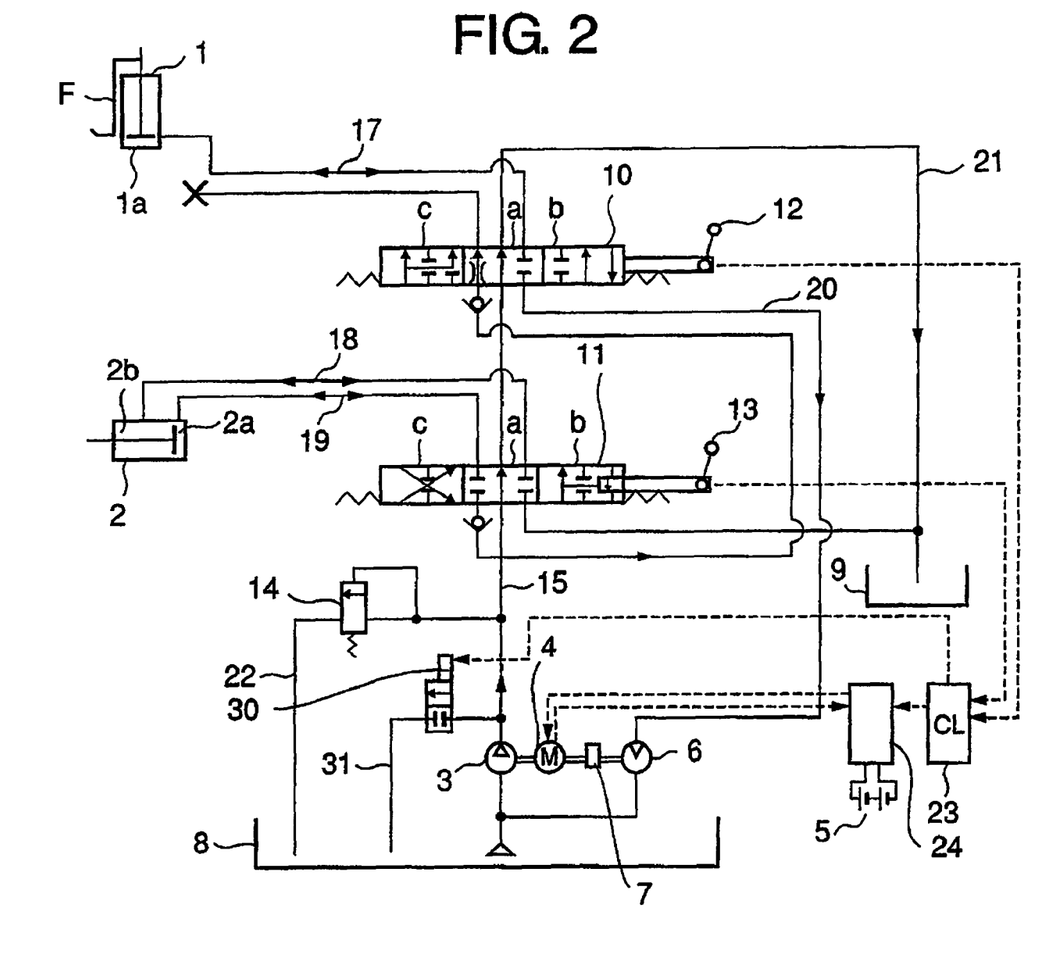
FIG. 2 is a schematic hydraulic lift circuit of the second embodiment of the invention.
Figure 3:
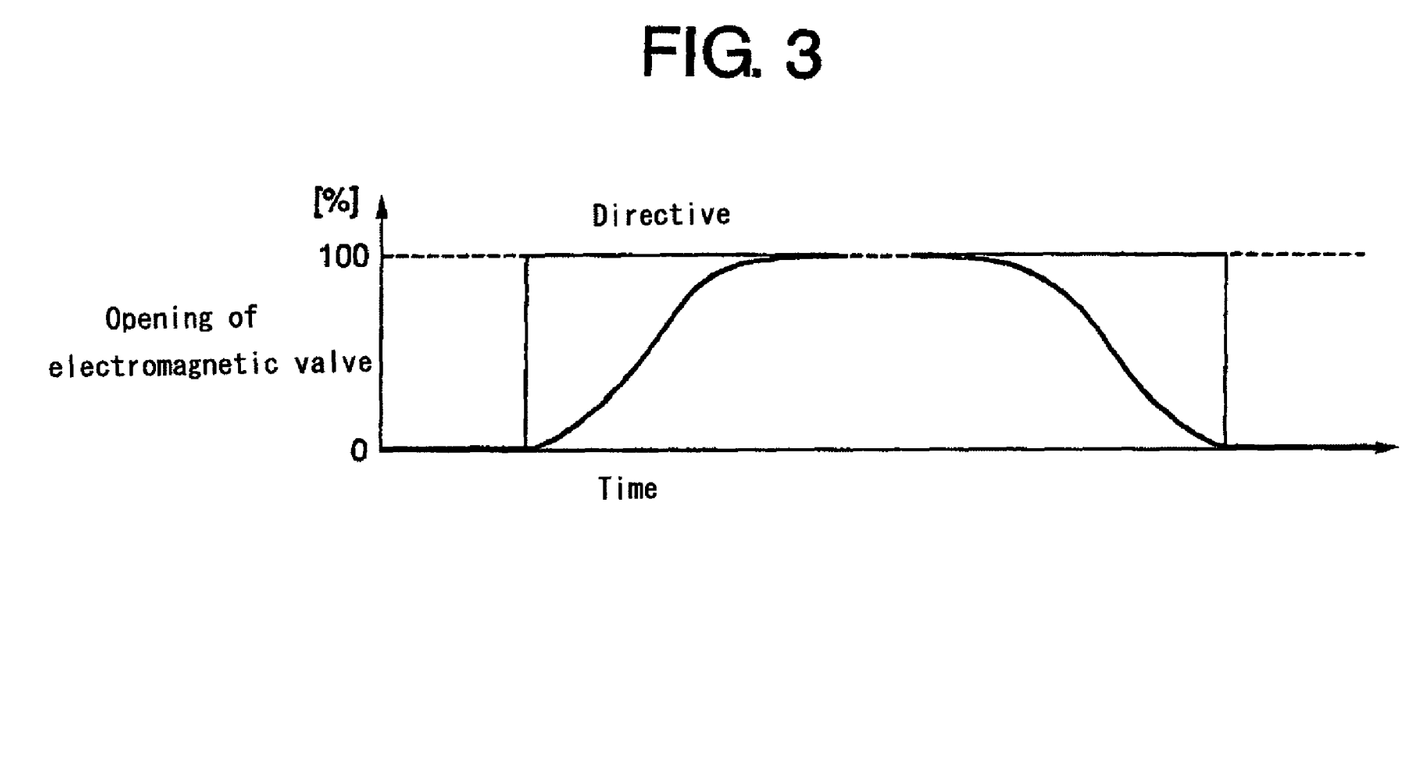
FIG. 3 is a diagram showing the opening/closing velocity vs. time of the electromagnetic valve used in the second embodiment.
Figure 4:
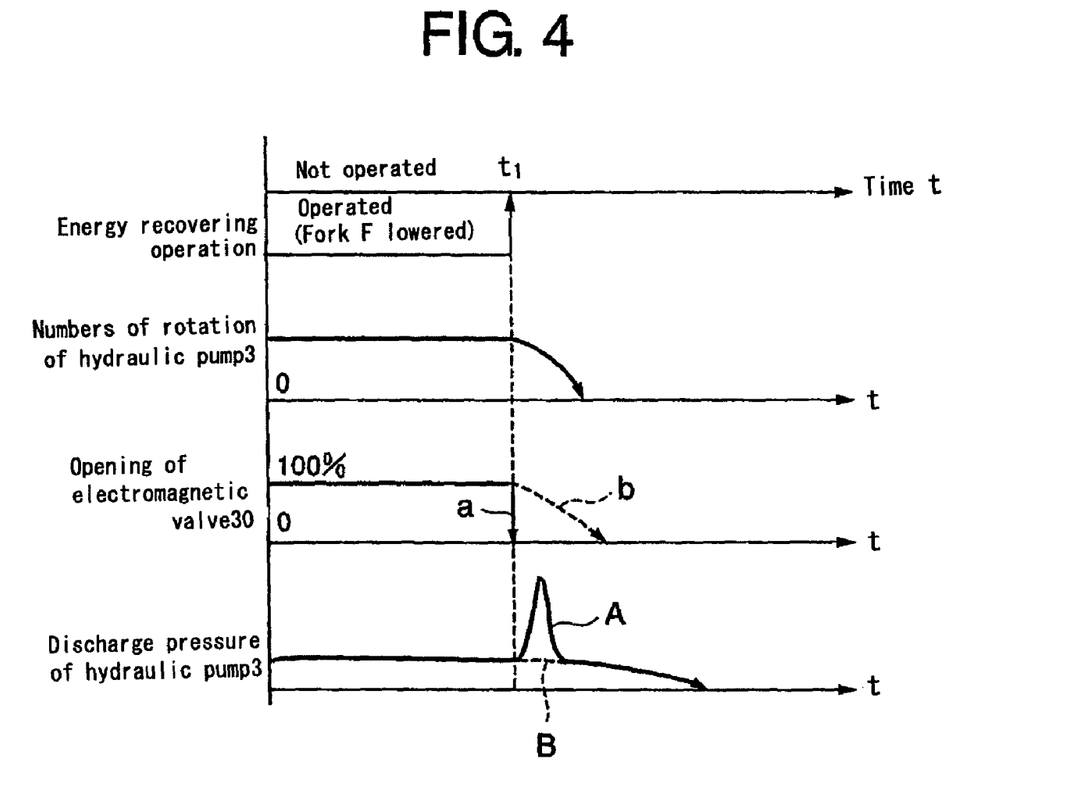
FIG. 4 is a diagram showing the discharge oil pressure variation of the hydraulic pump in the second embodiment.

Next, the second embodiment of the invention will be explained with reference to FIGS. 2-4. FIG. 2 is a schematic hydraulic lift circuit of the second embodiment of the invention, FIG. 3 is a diagram showing the opening/closing velocity vs. time of the electromagnetic valve used in the second embodiment, and FIG. 4 is a diagram showing the discharge oil pressure variation of the hydraulic pump in the second embodiment.

In the second embodiment, a return path 31 connected to the discharge side of the hydraulic pump 3 and an electromagnetic valve 30 disposed in the return path 31 are further added to the first embodiment as shown in FIG. 2 to allow the pressurized working oil to be returned to the oil reservoir tank 8. The rest of the construction is the same as that of the first embodiment, and constituent parts the same as those of the first embodiment are indicated by the same reference numerals.

The electromagnetic valve 30 opens the return path 31 upon receiving a directive from the controller 23 to allow the working oil discharged from the hydraulic pump 3 to the oil supply path 15 when the hydraulic pump 3 is driven by the hydraulic motor 6 via the electric motor 3 to be bypassed to the oil reservoir tank 8.

By this, the working oil discharged from the hydraulic pump 3 driven by the hydraulic motor 6 via the electric motor 3 to the oil supply path 15 when the lift means is lowered and the potential energy is recovered, can be bypassed to the oil reservoir tank 8, and energy loss due to driving the hydraulic pump 3 is largely reduced with the result that energy recovering efficiency is increased.

Further, by controlling the electromagnetic valve 30 by the controller 23 so that the valve 30 opens slowly and closes slowly as shown in FIG. 3, occurrence of rapid change in oil pressure when opening/closing the valve 30 is suppressed and operability is increased. An electromagnetic valve having the function as mentioned above is called a non-shock valve.

Oil pressure variation at the discharge side of the hydraulic pump 3 when the electromagnetic valve 30 closes will be explained with reference to FIG. 4.

When lowering operation of the fork F is finished and energy recovering operation ceases at $t_1$, the hydraulic pump 3 which has been rotated by the output torque of the hydraulic motor 6 via the electric motor 4 does not stop immediately due to rotatory inertia of the rotating members, its rotation speed decreases gradually as shown in FIG. 4. If the magnetic valve 30 is closed abruptly at $t_1$ as shown with a vertical straight line a, steep pressure rise occurs in oil pressure at the discharge side of the hydraulic pump 3 as shown with a curve A. If the magnetic valve 30 is closed slowly as shown with a broken curved line b, a steep pressure rise like this does not occur as shown with a broken curved line B.

By the way, in the second embodiment, it is suitable that two recovering paths 22 and 31 are integrated into one recovering path and an electromagnetic valve which serves both as the relief valve 14 and the electromagnetic valve 30 is disposed in the integrated recovering path.

The Third Embodiment

Figure 5:
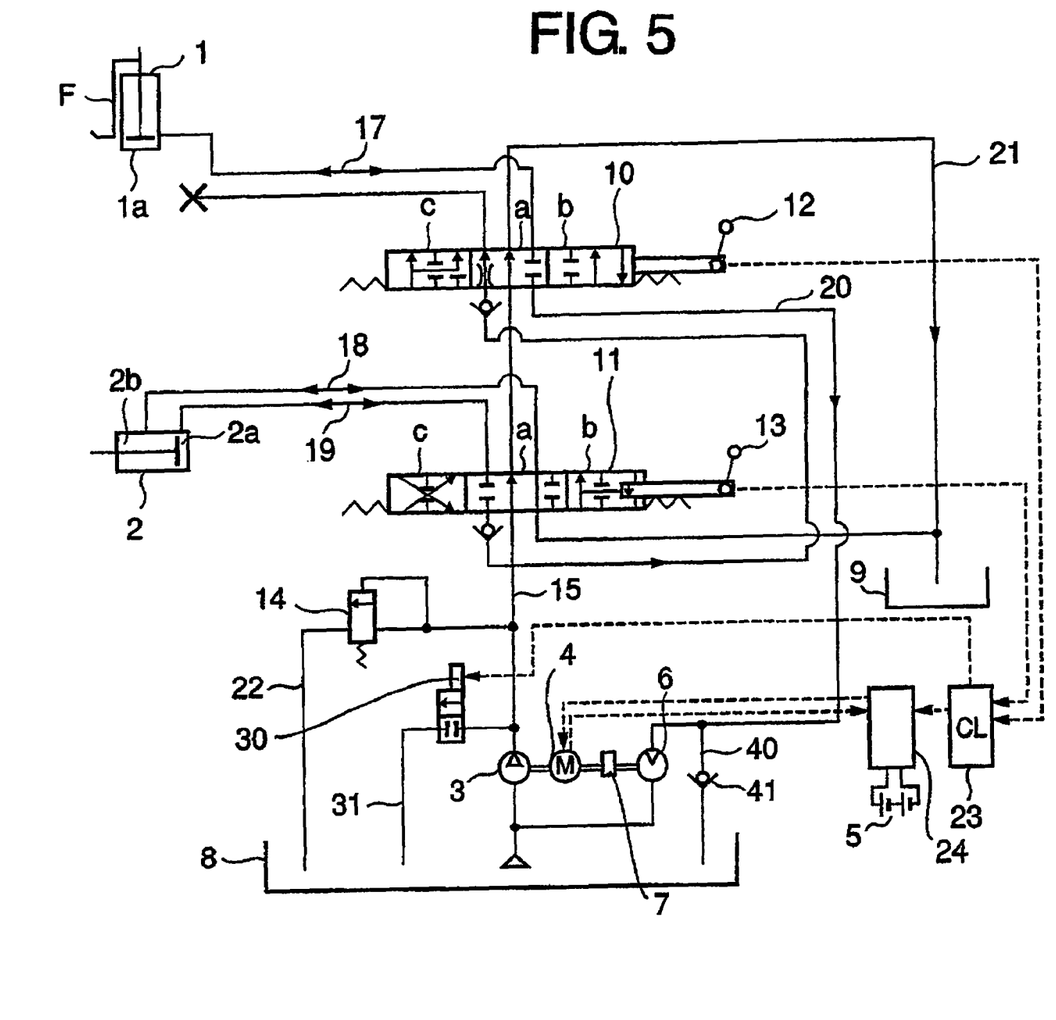
FIG. 5 is a schematic hydraulic lift circuit of the third embodiment of the invention.

Next, the third embodiment of the invention will be explained with reference to FIGS. 5-6. FIG. 5 is a schematic hydraulic lift circuit of the third embodiment, and FIG. 6 is a diagram showing the inlet oil pressure variation of the hydraulic motor in the third embodiment.

In the third embodiment, a branch path 40 branching from the upstream zone of the discharge side of the hydraulic motor 6 with its end part being immersed in the working oil in the oil reservoir tank 8 and a check valve 41 disposed in the branch path 40 to prevent working oil from flowing from the recovering path 20 to the oil reservoir tank 8, are further added to the second embodiment, as shown in FIG. 5. The rest of the construction is the same as that of the second embodiment.

Figure 6:
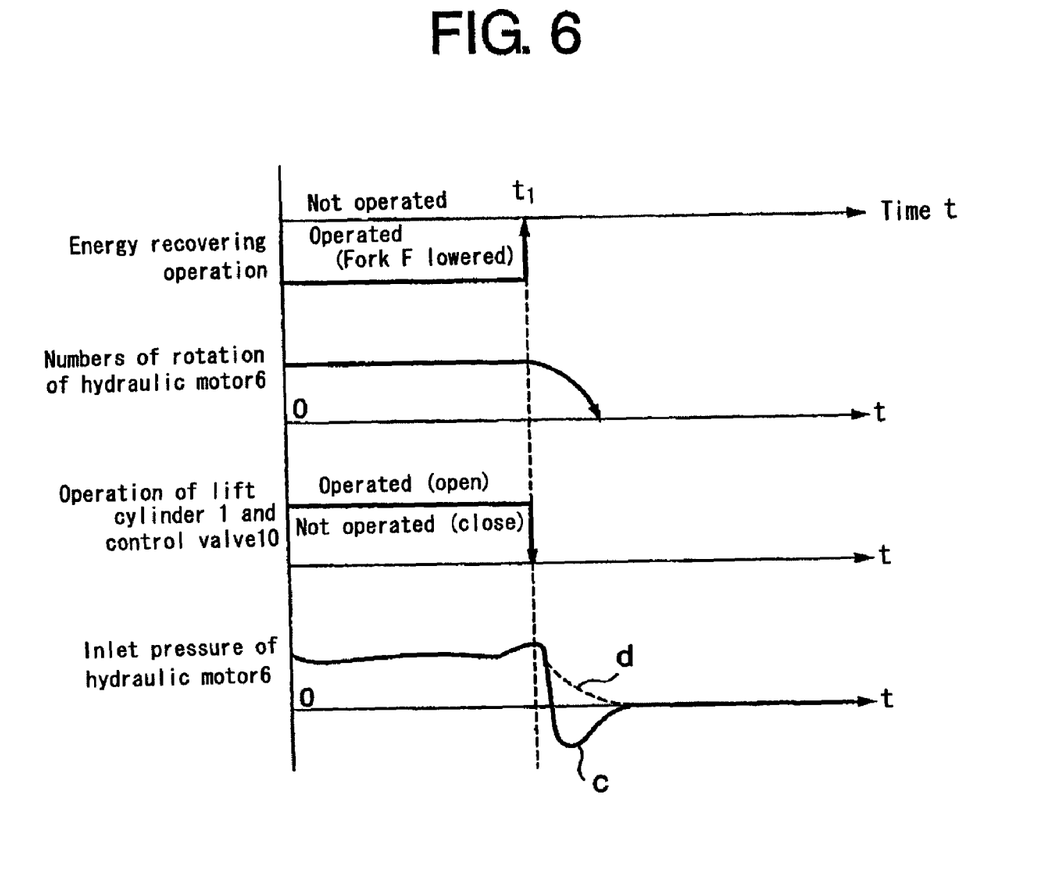
FIG. 6 is a diagram showing the inlet oil pressure variation of the hydraulic motor in the third embodiment.

As shown in FIG. 6, when lowering operation of the fork F is finished, the control valve 10 is closed at once. On the other hand, the hydraulic motor 6 continues to rotate for some time due to rotatory inertia of the rotating members, so negative pressure abruptly occurs at the inlet of the hydraulic motor 6 and cavitation is feared to occur which may cause damage to the hydraulic motor 6.

The occurrence of cavitation can be prevented by preventing the occurrence of negative pressure through allowing the working oil in the oil reservoir tank 8 to be sucked through the branch path 40 to the inlet of the hydraulic motor 6 when the negative pressure occurs at the inlet thereof, thereby preventing the occurrence of damage to the hydraulic motor 6.

The check valve 41 disposed in the branch path 40 prevents the working oil returning from the lift cylinder during energy recovering operation from being bypassed from the recovering path 20 to the oil reservoir tank 8 via the branch path 40.

The Fourth Embodiment

Figure 7:
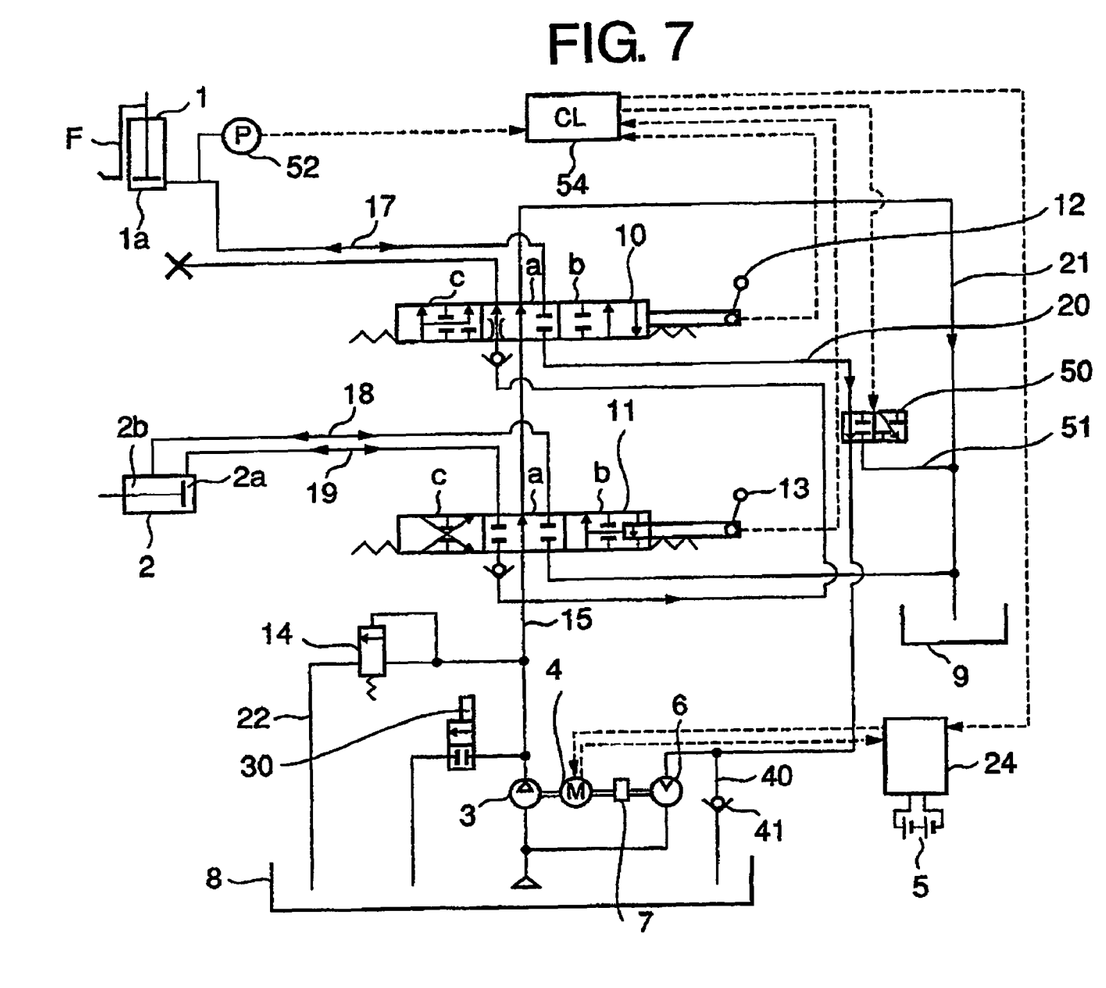
FIG. 7 is a schematic hydraulic lift circuit of the fourth embodiment of the invention.

Next, the fourth embodiment of the invention will be explained with reference to FIG. 7. FIG. 7 is a schematic hydraulic lift circuit of the fourth embodiment. In the fourth embodiment, a flow path changeover valve 50 disposed in the recovering path 20 connecting the control valve 10 to the hydraulic motor 6 to allow working oil to be selectively returned to the oil reservoir tank 9, a changeover path 51 for connecting the oil recovering path 20 to the oil recovering path 21 by way of the changeover valve 50, a pressure sensor 52 for detecting the pressure in the bottom oil chamber 1a of the lift cylinder 1, and a controller 54 which has a function to send a directive to the flow path changeover valve 50 based on the pressure detected by the pressure sensor 52 and inputted to the controller 54 in addition to the functions of the controller 23 in FIG. 5, are further added to the third embodiment with the controller 23 removed, as shown in FIG. 7. The rest of the construction is the same as that of the third embodiment of FIG. 5.

There is a possibility that, when the fork F is empty or light loaded and the hydraulic motor 6 can not be rotated by working oil returning through the oil recovering path 20 in load lowering operation due to pressure loss in the control valve 10 and the hydraulic motor 6, sufficient lowering speed of the fork F can not be obtained. In such a case, working oil is allowed to return to the oil reservoir tank 9 via the changeover path 51 without being introduced to the hydraulic pump 6 by manipulating the flow path changeover valve 50.

The Fifth Embodiment

Figure 8:
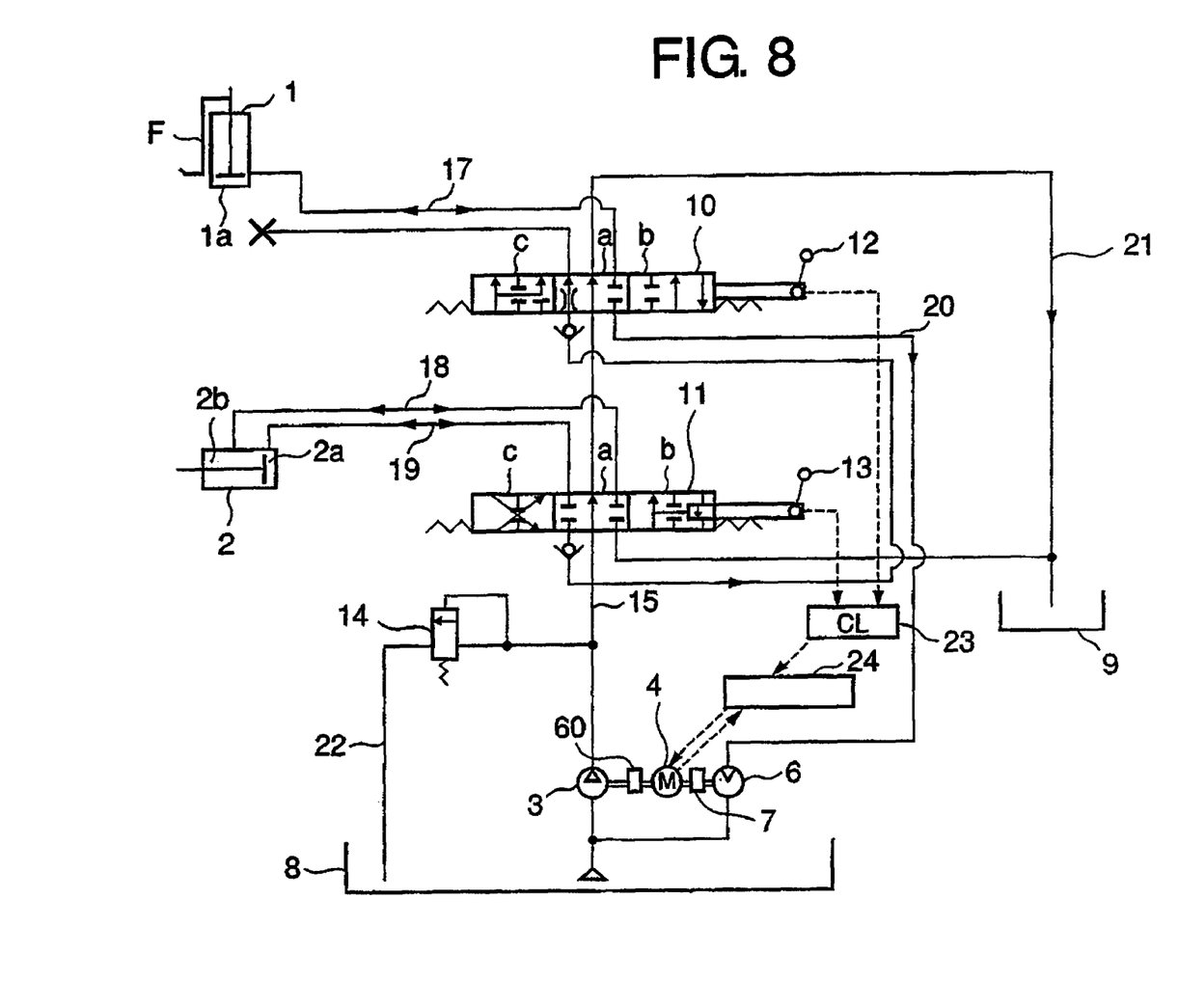
FIG. 8 is a schematic hydraulic lift circuit of the fifth embodiment of the invention.

Next, the fifth embodiment of the invention will be explained with reference to FIG. 8. FIG. 8 is a schematic hydraulic lift circuit of the fifth embodiment. In the fifth embodiment, an electromagnetic clutch 60 installed between the hydraulic pump 3 and the electric motor 4 is further added to the first embodiment of FIG. 1. The rest of the construction is the same as that of the first embodiment, and constituent parts the same as those of the first embodiment are indicated by the same reference numerals. By shutting off the electromagnetic clutch 60 when performing energy recovering operation, energy loss due to driving the hydraulic motor is eliminated and energy recovering efficiency is increased. The provision of the electromagnetic clutch 60 will result in increased cost. When making much account of cost and it is permissible to sacrifice cost to some extent, it is suitable to provide the electromagnetic valve 30 which opens when energy recovering operation is performed in order to allow the working oil discharged from the hydraulic pump rotated by the hydraulic motor via the electric motor to return to the oil reservoir tank 8 as is done in the second embodiment shown in FIG. 2, instead of providing the electromagnetic clutch 60.

The Sixth Embodiment

Figure 9:
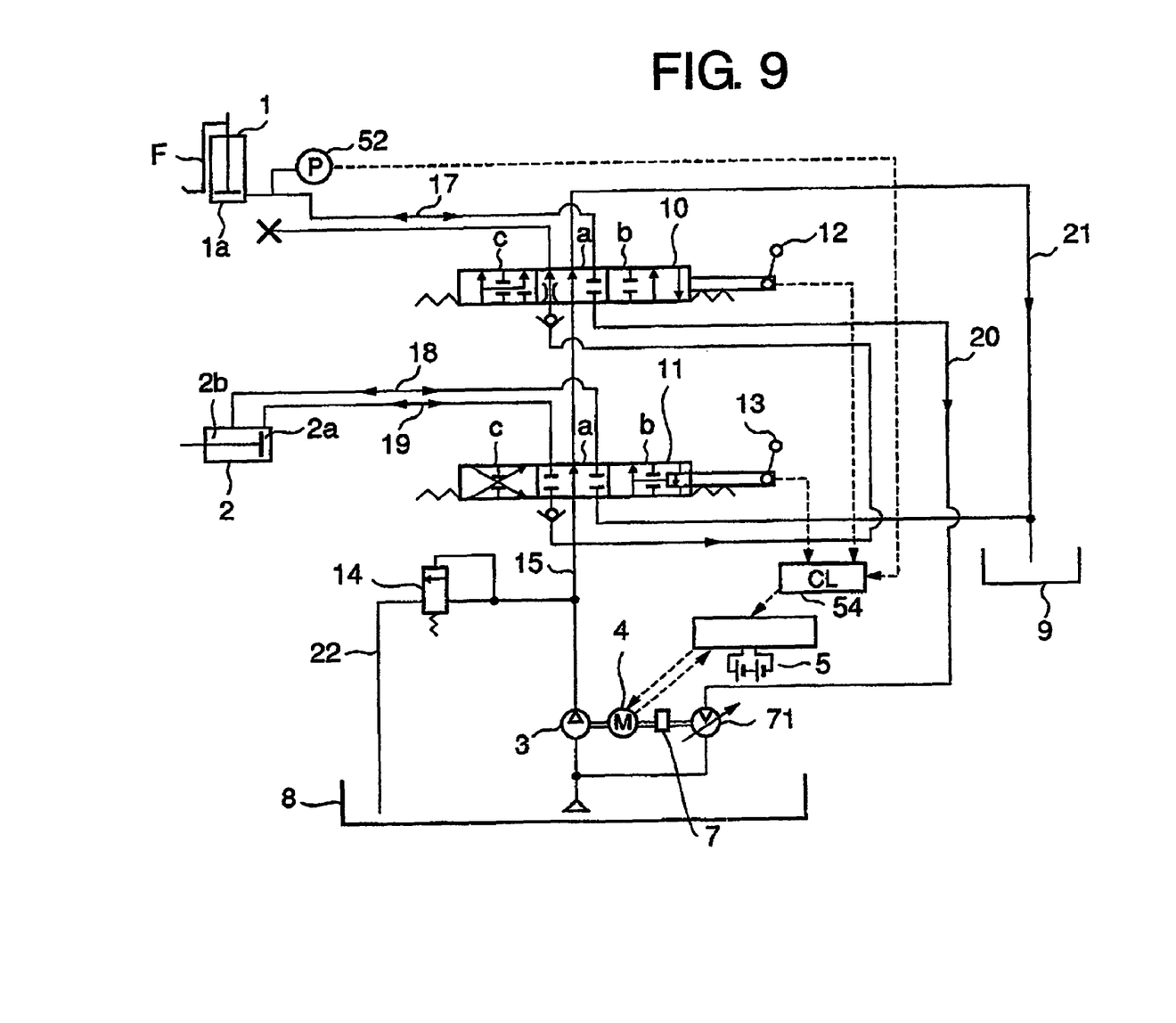
FIG. 9 is a schematic hydraulic lift circuit of the sixth embodiment of the invention.

Next, the sixth embodiment will be explained with reference to FIG. 9. FIG. 9 is a schematic hydraulic lift circuit of the sixth embodiment. In the sixth embodiment, the hydraulic pump 3 and the hydraulic motor 6 in the fifth embodiment are replaced by a swash plate type, variable capacity hydraulic pump 70 and a swash plate type, variable capacity hydraulic motor 71 respectively, the electromagnetic clutch 60 in the fifth embodiment is removed from the fifth embodiment, and the pressure sensor 52 and controller 54 of the fourth embodiment are added to the fifth embodiment, as shown in FIG. 9.

The rest of the construction is the same as that of the fifth embodiment.

In the sixth embodiment composed like this, rotation speed of the electric motor 3 and capacity of the hydraulic motor 71 and the hydraulic pump 70 are determined based on the oil pressure in the bottom chamber 1a of the lift cylinder 1 and the pivotal rates of the control levers 12, 13 (working oil flow rate is controlled by the pivotal rate) so that the hydraulic motor 71 and hydraulic pump 70 are operated with high efficiency.

The controller 54 controls the tilt angle of the swash plate of each of the hydraulic pump 70 or hydraulic pump 71 so that required flow rate of working oil is obtained.

In this way, the hydraulic pump 70 and hydraulic motor 71 can be operated with high efficiency through the combination of rotation speed and capacity of them not only in the load lowering operation but also in the road raising operation. Therefore, the hydraulic lift device can be operated with high efficiency.

INDUSTRIAL APPLICABILITY

According to the present invention, a system compact in structure for recovering the potential energy generated by a hydraulic lift device for a battery operated industrial tracks such as a forklift truck or the like can be provided, in which working fluid can be supplied to the lift cylinder and also to other actuators simultaneously while performing the energy recovering operation, energy recovering efficiency is improved, and operability is increased.

The invention claimed is:

1. An energy recovering system of a hydraulic lift device for
a battery operated industrial truck which is provided with a lift cylinder for lifting a lift means, an electric motor driven by a battery power source, a hydraulic pump for supplying pressurized working fluid to said lift cylinder to lift said lift means, and a control valve disposed between said lift cylinder and said hydraulic pump, whereby when said lift means lowers in a state the pressurized working oil is not being supplied to said lift cylinder the pressurized working fluid is returned from said lift cylinder to a working fluid reservoir tank by downward force exerting on the pressurized working fluid in said lift cylinder,
wherein a hydraulic motor is disposed in a working fluid recovering path through which the pressurized working fluid returns from said lift cylinder via said control valve so that said hydraulic motor is driven by the pressurized working fluid returning through said working fluid recovering path, and said hydraulic motor is connected to said electric motor with a one-way clutch with which torque transmission is possible only from said hydraulic motor to said electric motor,
wherein said electric motor serves both as an electric motor for driving the hydraulic pump and as an electric generator driven by the hydraulic motor for recovering energy, said hydraulic pump is driven by said hydraulic motor when the lift means is raised, while said electric motor and said hydraulic pump are driven by said hydraulic motor via the one-way clutch when the lift means is lowered.

2. An energy recovering system according to claim 1, wherein a second actuator for allowing another operation to be performed is provided in addition to said lift cylinder, and a second control valve through which pressurized working fluid is supplied to said second actuator from said hydraulic pump is provided.

3. An energy recovering system according to claim 2, wherein said second actuator is a tilt cylinder for tilting a mast to which a fork of a forklift truck is installed.

4. An energy recovering system according to claim 1, wherein an electromagnetic valve is disposed in a pressurized working fluid supply path connecting said hydraulic pump to said control valve, said electromagnetic valve being opened to allow pressurized working fluid discharged from said hydraulic pump to be returned to said working fluid reservoir tank when energy recovering operation is performed.

5. An energy recovering system according to claim 4, wherein a controller is provided for controlling said electromagnetic valve to open slowly and close slowly.

6. An energy recovering system according to claim 1, wherein a branch path branching from a working fluid recovering path connecting said control valve to said hydraulic motor with its end part being immersed in working fluid in said working fluid reservoir tank is provided, and a check valve is disposed in said branch path to prevent working fluid from flowing into said working fluid reservoir tank.

7. An energy recovering system according to claim 1, wherein are provided a flow path changeover valve disposed in said working fluid recovering path connecting said control valve to said hydraulic motor to allow working fluid to be selectively returned to said working fluid reservoir tank, a pressure sensor for detecting pressure in a bottom fluid chamber of said lift cylinder, and a controller which sends a directive to said flow path changeover valve to allow pressurized working fluid to bypass said hydraulic motor to be returned to said working fluid reservoir tank based on the pressure detected by said pressure sensor when said detected pressure is not sufficient for enabling energy recovering operation.

8. An energy recovering system according to claim 1, wherein an electromagnetic clutch is installed between said hydraulic pump and said electric motor.

9. An energy recovering system according to claim 1, wherein at least one of said hydraulic pump and hydraulic motor is of variable capacity type.

* * * * *